United States Patent [19]
Keeny et al.

[11] Patent Number: 6,083,627
[45] Date of Patent: Jul. 4, 2000

[54] POWDER COATINGS FROM MIXTURES OF THERMOPLASTIC VINYLIDENE FLUORIDE BASED RESINS AND POLYAMIDE RESINS

[75] Inventors: Brian D. Keeny, Shillington; Joseph L. Mitchell, Boyertown; David T. Wiggins, North Wales, all of Pa.

[73] Assignee: Elf Atochem North America, Inc., Philadelphia, Pa.

[21] Appl. No.: 09/377,090

[22] Filed: Aug. 19, 1999

Related U.S. Application Data

[62] Division of application No. 09/132,149, Aug. 11, 1998, Pat. No. 6,018,000.
[60] Provisional application No. 60/055,605, Aug. 12, 1997.
[51] Int. Cl.[7] .............................. B32B 17/10; B32B 27/06
[52] U.S. Cl. ....................... 428/435; 428/458; 428/474.4; 428/477.7
[58] Field of Search ................................. 428/474.4, 435, 428/458, 477.7

[56] References Cited

U.S. PATENT DOCUMENTS 5,716,684  2/1998  Stoeppelmann et al. ............ 428/36.91

*Primary Examiner*—Ana Woodward
*Attorney, Agent, or Firm*—Stanley A. Marcus; Royal E. Bright

[57] ABSTRACT

Pigmented and unpigmented polymeric resin blends containing up to 45 weight percent polyvinylidene fluoride based polymer and either polyamide 11 or polyamide 12 having particular usefulness in powder coating of objects are disclosed.

3 Claims, No Drawings

POWDER COATINGS FROM MIXTURES OF THERMOPLASTIC VINYLIDENE FLUORIDE BASED RESINS AND POLYAMIDE RESINS

This application claims priority from U.S. Provisional Application Serial No. 60/055,605 filed Aug. 12, 1997, now abandoned and is a divisional of application Ser. No. 09/132,149 filed Aug. 11, 1998 U.S. Pat. No. 6,018,000.

FIELD OF THE INVENTION

This invention relates to compositions of matter classified in the, art of chemistry as polymers based on fluoropolymers, more specifically homopolymers of vinylidene fluoride (VDF) and copolymers of vinylidene fluoride with comonomers selected from hexafluoropropylene (HFP) tetrafluorethylene (TFE), chlorotrifluorethylene (CTFE), trifluoroethylene (TrFE), and/or vinylfluoride (VF), in combination with polymers, more specifically non-thermosetting polyamide (nylon) polymers, to compositions containing them, more specifically to powder coating compositions containing them, and to processes for the preparation and use of the compositions containing the fluoropolymers and polyamide polymers and for the use of the fluoropolymer and polyamide polymer combinations themselves.

BACKGROUND OF THE INVENTION

U.S. Pat. No. 5,106,910 describes a mixture of polyvinylidene fluoride, nylon 11 and a compatible adhesive to secure the coating to the substrate. The preferred composition is polyvinylidene fluoride, nylon and a nylon terpolymer/caprolactam adhesive. The coating is preferably applied by plasma spray.

U.S. Pat. No. 3,340,222 suggests inter alia that amide group containing polymers may be used in connection with fluoropolymers to aid in film formation and ultimate coating performance. At a maximum 50% of the combination is to be the amide group containing polymer and on closer examination of the text it its clear that the amide containing polymers referred to are acrylamide polymers not polyamide polymers.

U.S. Pat. No. 3,826,794 describes the addition of selected polyamide polymers to polyvinylidene fluoride based polymers for the purpose of improving the impact strength of PVDF polymers. The amount of polyamide is from 30% to 55% by weight and the choice of polyamide is stated to be critical. Polyamide from aminoundecanoic acid, polyamide (nylon) 11 if made from the commonly available aminoundecanoic acid, 10-aminoundecanoic acid, is specifically stated to be incompatible with PVDF polymers along with polyamides from 6-aminocaproic acid.

Suitable polyamides are stated to be those described from branched diamines having carbon chain lengths defined in the patent.

The present invention provides mixtures of PVDF polymers and polyamide 11, or polyamide 12, having less than 45% by weight PVDF polymers which are fusible powders suitable for providing pigmented or unpigmented coatings on substrates, particularly metal substrates and which are also capable of being formed by common techniques, such as by injection molding or extrusion, into two or three dimensional objects having superior surface properties to corresponding polyamides not containing the PVDF polymers. The compositions of the instant inventions are free of the compatible adhesive of U.S. Pat. No. 5,106,910.

SUMMARY OF THE INVENTION

The invention provides in a first composition aspect a resin composition consisting essentially of a blend of from 0.01% up to 45% by weight polyvinylidene fluoride based polymer and from greater than 55% to 99.99% by weight polyamide polymer selected from the group consisting of polyamide 11 and polyamide 12.

The tangible embodiments of the first composition aspect of the invention possess the inherent applied use characteristic of being fusible to provide coatings on substrates having high stain resistance, good weatherability and flexibility, good scuff, wear and abrasion resistance while having good adhesion to the substrate on which they are coated with good gloss and overall appearance.

The invention provides in a second composition aspect, an article of manufacture comprising a substrate coated on at least one surface thereof with a coating formed from the first composition aspect of the invention.

The invention provides in a third composition aspect, an article of manufacture comprising a three-dimensional object formed by applying a low shear forming method to a composition as defined in the first composition aspect of the invention.

DEFINITIONS

"Polyamide 11" means poly 11-aminoundecanoic acid.

"Polyamide 12" means poly 12-amino lauric acid.

"Polyvinylidene fluoride based polymer," "PVDF polymer" or "PVDF resin" means polyvinylidene fluoride or copolymers of vinylidene fluoride with comonomers such as hexafluoropropylene, tetrafluoroethylene, chlorotrifluoroethylene, trifluoroethylene, and/or vinylfluoride. The inclusion of small quantities of terpolymers of vinylidene fluoride among the copolymers is contemplated by the invention.

The inclusion of the vinylidene fluoride, tetrafluoroethylene, hexafluoropropylene terpolymer of U.S. Pat. No. 5,346,727 in quantities up to about 5% by weight in the dry resin PVDF polymer mixture is contemplated as is inclusion of the terpolymers of European Patent Application 0659846A2. The terpolymers may be blended into the starting latex before isolation of the PVDF polymer resin or they may be blended in later in the dry state.

"Consisting essentially of" in this specification and the appended claims means the compositions described and claimed are substantially free of the compatible adhesive as described in U.S. Pat. No. 5,106,910, but they may contain the other permissible additives described as options in this specification.

DETAILED DESCRIPTION OF THE INVENTION

The invention will now generally be described with reference to preferred embodiments thereof so as to enable one of skill in the art to make and use the same.

The vinylidene fluoride homo- and co-polymer resins employed as starting materials are known, as are their methods of preparation. See, for example Humphrey and Dohany, *Vinylidene Fluoride Polymers, Encyclopedia of Polymer Science and Engineering,* 2nd Edition, Vol. 17, pp 532 to 548 1989, John Wiley and Sons, and the references cited therein. See also U.S. Pat. Nos. 3,857,827; 4,360,652; 4,569,978; 3,051,677; 3,178,399; 5,093,427; 4,076,929; 5,543,217; Moggi et al., Polymer Bulletin, 7, pp 115 to 122, (1982), Bonadardelli et al., Polymer, 27, pp. 905–909 (1986), Pianca, et al., Polymer, 28, pp 224 to 230 (1987), and Abusleme et al., European Patent Application No. 650,982, A1. The resins so prepared may be homopolymer PVDF or copolymer PVDF with suitable monomers for copolymerization with VDF being selected from HFP, CTFE, TFE, TrFE, VF or mixtures thereof. HFP is a preferred comonomer.

Up to about 30% weight comonomer(s) may be incorporated in PVDF copolymer with from about 5% to 20% by weight being preferred. Resins of terpolymers of VDF, particularly those of VDF, TFE and HFP may also be incorporated in the resins employed as starting materials.

Use of resins prepared by emulsion or suspension polymerization in vertical or horizontal batch reactors or in continuous reactors is contemplated by the invention.

The polymer resin may be obtained as a dried powder from the latex obtained during their synthesis suitable for blending into the compositions of the invention by methods well known in the art which need not be detailed here. Such methods include: drying of latex, coagulation by high shear mixing, centrifugation, and/or altering the ionic balance and/or freezing followed by filtration and optional washing and the like.

The polyamide 11 and polyamide 12 resin which are to be blended with the polyvinylidene fluoride based resins are also well known articles of commerce and are both available in grades suitable for powder coating application from Elf Atochem S.A. and its subsidiary company Elf Atochem North America, Inc.

Blending the PVDF resin and the polyamide resin may be accomplished simply by blending the powdered resins in the desired portions by weight using any convenient standard powder blending technique.

If desired, pigment (s) (or other colorant (s)) may be incorporated at the time of initial blending of the resins or it may be blended into the preformed mixture at a later time. Pigment (or other colorant) may also be combined with either resins prior to blending of the resins and be introduced into the mixtures in that fashion.

Any pigment (or other colorant) known to be useful in polyamide and/or polyvinylidene fluoride based coatings may be employed.

The pigments may include, for example, those pigments identified in U.S. Pat. No. 3,340,222. The pigment (or other colorant) may be organic or inorganic. According to one embodiment, the pigment may comprise titanium dioxide, or titanium dioxide in combination with one or more other inorganic pigments wherein titanium dioxide comprises the major part of the combination. Inorganic pigments which may be used alone or in combination with titanium dioxide include, for example, silica, iron oxides of various colors, cadmium, lead titanate, and various silicates, for example, talc, diatomaceous earth, asbestos, mica, clay and basic lead silicate. Pigments which may be used in combination with titanium dioxides include, for example, zinc oxide, zinc sulfide, zirconium oxide, white lead, carbon black, lead chromate, leafing and non-leafing metallic pigments, molybdate orange, calcium carbonate and barium sulfate.

The preferred pigment category is the ceramic metal oxide type pigments which are calcined.

Chromium oxides and some iron oxides of the calcined type may also be satisfactorily utilized. For applications where a white coating is desired, a non-chalking, non-yellowing rutile-type of titanium dioxide is recommended. Lithopones and the like are inadequate as they suffer from lack of chalk resistance and/or from inadequate hiding. Anastase $TiO_2$ is similarly not recommended.

The pigment (or other colorant) component, when present, is advantageously present in the composition the amount of from about 0.1 to about 50 parts by weight per 100 parts of resin component. While for most applications the preferred range is from about 5 to about 20 parts by weight pigment per 100 parts of resin component.

Clear metallic pigmented coats will have very low amounts by weight of pigment.

The powder coating may be applied to the substrate by any known conventional application method which will provide a uniform coating. Typical techniques are fluidized bed, thermal spray, or preferably electrostatic coating.

The powder coating may be applied to the substrate with or without a primer coating. After application, the coating is subjected to a temperature above the melt temperature of the coating formulation, preferably between about 450° F. and 500° F. (232° to 260° C.)

Due to the high bake temperatures, the coatings are primarily useful as coatings on metal substrates and similar thermally stable substrates, such as, aluminum, steel, glass and ceramics. The applications of such coated substrates are primarily decorative where long term UV resistance and/or impact resistance are required. Typical examples are metal building parts (window frames, door frames roofing, wall panels, furniture components and the like) and automotive components. Use as functional coatings (for corrosion and/ or wear resistance, for example) is also contemplated.

Improved performance in such traditional uses of polyamide based powder coatings such as dishwasher baskets, hot water heater tank liners, shopping carts, file rods and mechanical parts will be obtained.

Similarly, three-dimensional formed objects can be produced from embodiments of the first composition aspect of the invention by low shear methods conventionally employed for forming polyamide objects, such as injection molding, roto molding and the like, and the objects so formed will have superior use properties to objects formed by similar methods from otherwise analogous polyamides not admixed with PVDF polymers. For such uses, obviously, grades of polyamide known to be suitable for the forming technique will be selected by one of skill in the art.

One of skill in the art will also recognize that the above described application and fabrication methods are generally applicable in the presence or absence of pigments or other colorants.

Examination of the surface of embodiments of the second composition aspect of the invention by conventional analytical techniques such as, Scanning conventional analytical techniques such as, Scanning Electron Microscopy (SEM) and X-ray Photoelectron Spectroscopy (XPS) provides data consistent with a final structure having a greater concentration of PVDF based polymer on the surface. At PVDF concentrations of about 5% by weight or greater, the data obtained is consistent with a surface of substantially all PVDF based polymer with few or no breaks in the PVDF based polymer layer.

The PVDF resin powder may be incorporated with the polyamide resin powder in concentrations of from 0.01 up to 45% by weight depending on the desired use properties of the final product. For normal powder coating purposes from about 5% to about 15% by weight is preferred with about 10% by weight being most preferred. For better surface decorative appearance, concentrations of PVDF resin in the lower portion of the concentration range are preferred. For increased stain and chemical resistance, concentrations of PVDF resin in the higher ranges are preferred.

One of skill in the art will also recognize that in addition to the afore described thermoplastic PVDF resins, other known thermoplastic fluoropolymers such as polytetrafluoroethylene and polyvinyl fluoride may be employed in conjunction with or in place of the PVDF based resins. The commonly known PVDF based fluoroelastomers and other known fluoroelastomers are also contemplated as equivalents in the powder blends of the first composition aspect of the invention and in the coated objects of the second composition aspect of the invention.

The following examples further illustrate the best mode contemplated by the inventor for the practice of their invention and are intended to be illustrative and not in limitation thereof.

EXAMPLES 1 to 5

Blends of powder coating resin formulation were prepared from a commercially available PVDF based polymer in powder form (KYNAR® 711 from Elf Atochem North America, Inc.) and commercially available pigmented polyamide 11 resin powder (RILSAN® 5498HV FB from Elf Atochem North America, Inc.). The concentration value given for each example represents the percent by weight PVDF based resin in the blend with the balance being polyamide. The powder coating resin formulations were coated on grit blasted steel or aluminum plates either unprimed or primed with conventional epoxy phenolic primers known to enhance the adhesion of polyamides to metal substrates, using conventional fluidized bed dipping techniques or electrostatic spray and then fused at temperatures above the fusion point of the resin powders. Properties dependent on the substrate, primer and application technique appeared relatively constant among samples and consequently are not reported.

Surface characteristics reported are dependent on relative concentration of the resins in the coating materials not on other factors for these examples.

Sample preparation: Representative samples were cut from each panel to a size of about 1 cm×1.5 cm. The samples were then coated with approximately 50 nm of gold/palladium (60 sec. sputter) to reduce surface charging and specimen damage from electron irradiation in the SEM.

The high surface sensitivity of XPS demanded special surface preparation for the XPS samples. The as-received surface of the samples are generally covered with a layer of particulate and organic contaminants (i.e. fingerprints, atmospheric dust, organic material). The layer of contaminants was removed by Carbon Dioxide Snow cleaning. This cleaning process carries away particulate and organic contaminants while leaving no harmful residue that would interfere with the surface analysis.

| Example No. | PVDF Resin Concentration |
| --- | --- |
| 1 (control) | 0% |
| 2 | 2% |
| 3 | 5% |
| 4 & 5 | 10% |

Surface analysis by SEM:

Example 1—The surface was fairly smooth and featureless except for numerous cracks and white spots. The white spots are titanium based pigments.

Example 2—This surface showed a surface layer with circular "holes" through which a polyamide type surface is visible. In conjunction with XPS results reported below, this is consistent with a layer of PVDF based polymer on the surface, but one that in not continuous. The surface layer has three regions: a structureless network type of region surrounding the exposed polyamide areas, a smooth area with cracks resembling a dried out mudflat and circular growth regions with radial lines.

Example 3—The surface resembled the surface of Example 2 except no polyamide regions were visible. The surface contained some depressions and small holes.

Examples 4 & 5—Very similar surface appearance to Example 3 but perhaps fewer holes.

Analysis by XPS:

In this technique, the sample is irradiated with monochromatic X-rays causing electrons to be ejected by the Einstein photoelectric effect. These photoelectrons have characteristic energies unique to each element in the periodic table. With sufficient energy resolution, the chemical environment of the atoms may be inferred from small changes in these characteristic energies. This method analyzes the top-most 10 nm of the surface (electrons originating further down can not escape the surface) and is therefore very surface sensitive. The data consists of plots of electron counts versus energy in which each peak represents a specific electron shell. Every element except hydrogen (which can sometimes be inferred from the chemical shifts) can be detected.

Surface analysis by XPS:

Low resolution survey spectra (0 to 1400 eV) were run for each surface. All significant peaks were identified by element. The surfaces contained mostly carbon, fluorine and oxygen. Trace amounts of nitrogen were also found, as expected, from the polyamide in the coating.

High resolution spectra were obtained for carbon, oxygen, fluorine and nitrogen. These high resolution spectra were used to quantify the amount of PVDF resin at the surface of the coating.

By comparing the subpeak positions for each element with standard tables, it is possible to estimate the amounts of polyamide and PVDF based polymer present.

The results obtained are summarized:

Example 1—The data obtained matched those from polyamide extremely well.

Example 2—Almost half the surface is polyamide. This result is consistent with migration of PVDF resin to the surface preferentially.

Example 3—No detectable polyamide on the surface.

Examples 4 & 5—No detectable polyamide on the surface.

Examination for Gloss:

For all samples 60° Gloss was determined by ASTM D523-89.

Gloss was found to decrease over the value found for any particular polyamide 11 sample applied by any particular technique to any particular substrate with increasing PVDF resin content.

EXAMPLE 6

A roto molded tank was made from a blend, dry mixed in a Henschel mixer, of 90% by weight of a standard RILSAN® roto molding grade of polyamide 11 (from Elf Atochem North America, Inc.) and 10% by weight KYNAR® 711, XPS analysis of the inner and outer surfaces as well as a cut surface. The results show a significant enrichment of the KYNAR fraction of the resin mixture on the inner surface. This result is consistent with the results shown above for the powder coatings.

The subject matter which applicants regard as their invention is particularly pointed out and distinctly claimed as follows:

We claim:

1. An article of manufacture comprising a substrate selected from the group consisting of metal, glass and ceramic substrates coated on at least one surface thereof with coating formed from a resin composition consisting essentially of:

(a) from 0.01% up to 45% by weight polyvinylidene fluoride based polymer; and (b) from greater than 55% to 99.99% by weight polyamide polymer selected from the group consisting of polyamide 11 and polyamide 12.

2. The article of manufacture as defined in claim 1 wherein the polyamide in the resin composition is polyamide 11.

3. The article of manufacture defined in claim 1 wherein the metal substrate is selected from the group consisting of steel and aluminum substrates.

* * * * *